(12) United States Patent
Khayatian et al.

(10) Patent No.: US 11,269,330 B2
(45) Date of Patent: Mar. 8, 2022

(54) SYSTEMS AND METHODS FOR INTERSECTION MANAGEMENT OF CONNECTED AUTONOMOUS VEHICLES

(71) Applicants: Mohammad Khayatian, Tempe, AZ (US); Aviral Shrivastava, Tempe, AZ (US); Mohammadreza Mehrabian, Tempe, AZ (US)

(72) Inventors: Mohammad Khayatian, Tempe, AZ (US); Aviral Shrivastava, Tempe, AZ (US); Mohammadreza Mehrabian, Tempe, AZ (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 182 days.

(21) Appl. No.: 16/694,451

(22) Filed: Nov. 25, 2019

(65) Prior Publication Data

US 2020/0166934 A1 May 28, 2020

Related U.S. Application Data

(60) Provisional application No. 62/772,185, filed on Nov. 28, 2018.

(51) Int. Cl.
| | | |
|---|---|---|
| G05D 1/00 | (2006.01) | |
| G08G 1/07 | (2006.01) | |
| G08G 1/01 | (2006.01) | |
| G05D 1/02 | (2020.01) | |

(52) U.S. Cl.
CPC ......... *G05D 1/0088* (2013.01); *G05D 1/0285* (2013.01); *G08G 1/0112* (2013.01); *G08G 1/0133* (2013.01); *G08G 1/07* (2013.01); *G05D 2201/0213* (2013.01)

(58) Field of Classification Search
CPC ............... G05D 1/0088; G05D 1/0285; G05D 2201/0213; G08G 1/0112; G08G 1/0133; G08G 1/07
See application file for complete search history.

(56) References Cited

U.S. PATENT DOCUMENTS

| | | | |
|---|---|---|---|
| 9,015,689 B2 | 4/2015 | Bai et al. | |
| 9,513,886 B2 | 12/2016 | Bai et al. | |
| 10,235,885 B2* | 3/2019 | An | G08G 1/09626 |
| 10,296,312 B2 | 5/2019 | Shrivastava et al. | |
| 10,437,256 B2 | 10/2019 | Andert et al. | |
| 10,743,198 B1* | 8/2020 | Park | H04W 24/02 |
| 10,860,023 B2* | 12/2020 | Di Cairano | G05D 1/0088 |
| 10,964,207 B2* | 3/2021 | Mobasser | G08G 1/083 |
| 2016/0170725 A1 | 6/2016 | Holton et al. | |

(Continued)

OTHER PUBLICATIONS

US Department of Transportation—Federal Highway Administration, "Roadway Safety Data Dashboards," Online: accessed [May 15, 2017].

(Continued)

*Primary Examiner* — Nicholas Kiswanto
(74) *Attorney, Agent, or Firm* — Polsinelli PC

(57) ABSTRACT

Various embodiments of an intersection management system for managing autonomous vehicles approaching an intersection in which a Time of Arrival, Velocity of Arrival, and path trajectory are calculated for each approaching vehicle are disclosed.

19 Claims, 9 Drawing Sheets
(9 of 9 Drawing Sheet(s) Filed in Color)

(56) References Cited

U.S. PATENT DOCUMENTS

| | | | |
|---|---|---|---|
| 2016/0246602 A1 | 8/2016 | Hari et al. | |
| 2019/0051171 A1* | 2/2019 | Malkes | H04W 4/024 |
| 2019/0196912 A1 | 6/2019 | Didehban et al. | |
| 2019/0378542 A1 | 12/2019 | Didehban et al. | |
| 2020/0133672 A1 | 4/2020 | Balasubramanian et al. | |
| 2020/0209886 A1* | 7/2020 | Lee | G05D 1/0276 |
| 2020/0313848 A1* | 10/2020 | Troia | H04L 9/0825 |
| 2021/0046923 A1* | 2/2021 | Olson | B60W 30/09 |

OTHER PUBLICATIONS

Morales Medina et al., "Cooperative Intersection Control based on Virtual Platooning," 2017.

Perronnet et al., "Cooperative Intersection Management: Using Mini-Robots to Compare Sequenced-based Protocols," Les Journees' Nationales des Communications dans les Transports (JNCT), 2013.

Malikopoulos et al., "A Decentralized Energy-Optimal Control Framework for Connected Automated Vehicles at Signal-Free Intersections," arXiv preprint arXiv:1602.03786, 2016.

Lee et al., "Development and Evaluation of A Cooperative Vehicle Intersection Control Algorithm under The Connected Vehicles Environment," IEEE ITS Transactions, 2012.

Dresner et al., "A Multiagent Approach to Autonomous Intersection Management," Journal of artificial intelligence research, vol. 31, pp. 591-656, 2008.

Zohdy et al., "Intersection Management via Vehicle Connectivity: The Intersection Cooperative Adaptive Cruise Control System Concept," Journal of Intelligent Transportation Systems, vol. 20, No. 1, pp. 17-32, 2016.

Andert et al., "Crossroads: Time-Sensitive Autonomous Intersection Management Technique," in Proceedings of the 54th Annual Design Automation Conference 2017, p. 50, ACM, 2017.

Shrivastava et al., "Time in Cyber Physical Systems," in Hardware/Software Codesign and System Synthesis (CODES + ISSS), 2016 International Conference on, pp. 1-10, IEEE, 2016.

Shrivastava et al., "A Testbed to Verify the Timing Behavior of Cyber-Physical Systems," in Proceedings of the 54th Annual Design Automation Conference 2017, p. 69, ACM, 2017.

Gustafsson et al., "Automatic Derivation of Loop Bounds and Infeasible Paths for WCET Analysis using Abstract Execution," in Real-Time Systems Symposium, 2006. RTSS'06. 27th IEEE International, pp. 57-66, IEEE, 2006.

Li et al., "Cooperative Driving at Blind Crossings using Intervehicle Communication," IEEE Transactions on Vehicular Technology, vol. 55, No. 6, pp. 1712-1724, 2006.

Chen et al., "Cooperative Intersection Management: A Survey," IEEE Transactions on Intelligent Transportation Systems, vol. 17, No. 2, pp. 570-586, 2016.

Milanes et al., "Controller for Urban Intersections Based on Wireless Communications and Fuzzy Logic," IEEE Transactions on Intelligent Transportation Systems, vol. 11, No. 1, pp. 243-248, 2010.

Carlino et al., "Auction-Based Autonomous Intersection Management," in ITSC, 16th International IEEE Conference on, pp. 529-534, IEEE, 2013.

Fok et al., "A Platform for Evaluating Autonomous Intersection Management Policies," in Proceedings of IEEE/ACM 3rd International Conference on Cyber-Physical Systems, IEEE Computer Society, 2012.

Quinlan et al., "Bringing Simulation to Life: A Mixed Reality Autonomous Intersection," in Intelligent Robots and Systems (IROS), pp. 6083-6088, IEEE, 2010.

Dresser et al., "Sharing the Road: Autonomous Vehicles Meet Human Drivers," in International Joint Conference on Artificial Intelligence, vol. 7, pp. 1263-1268, 2007.

Jin et al., "Advanced Intersection Management for Connected Vehicles using a Multi-agent Systems Approach," in Intelligent Vehicles Symposium (IV), 2012 IEEE, pp. 932-937, IEEE, 2012.

Tachet et al., "Revisiting Street Intersections using Slot-based Systems," PloS one, vol. 11, No. 3, 2016.

Ahn et al., "Safety verification and control for collision avoidance at road intersections," IEEE Transactions on Automatic Control, vol. 63, No. 3, pp. 630-642, 2018.

Fayazi et al., "Optional Scheduling of Autonomous Vehicle Arrivals at Intelligent Intersections via MILP," in American Control Conference (ACC), 2017, pp. 4920-4925, IEEE, 2017.

Gelfand et al., Calculus of Variations. Courier Corporation, 2000.

Hardy et al., "WCET Analysis of Multi-level non-inclusive Setassociative Instruction Caches," in Real-Time Systems Symposium, 2008, pp. 456-466, IEEE, 2008.

Chattopadhyay et al., "Unifie Cache Modeling for WCET Analysis and Layout Optimizations," in Real-Time Systems Symposium, 2009, RTSS 2009. 30th IEEE, pp. 47-56, IEEE, 2009.

Shalev-Shwartz et al., "On a Formal Model of Safe and Scalable Self-driving Cars," arXiv preprintarXiv:1708.06374, 2017.

Mehrabian et al., "Timestamp Temporal Logic (TTL) for Testing the Timing of Cyber-Physical Systems," in Proceedings of the Annual Embedded System WEEK (ESWEEK), ACM, 2017.

Mehrabian et al., "An Efficient Timestamp-based Monitoring Approach to Test Timing Constraints of Cyber-physical Systems," in Proceedings of the 55th Annual Design Automation Conference, p. 144, ACM, 2018.

Mills, "Computer Network Time Synchronization," in Report Dagstuhl Seminar on Time Services Schloß Dagstuhl, March, vol. 11, p. 332, Springer, 1997.

Fitzpatrick et al., "Turn Speeds and Crashes within Right-turn Lanes," tech. rep., Texas Transportation Institute, Texas A & M University System, 2005.

* cited by examiner

SYSTEMS AND METHODS FOR INTERSECTION MANAGEMENT OF CONNECTED AUTONOMOUS VEHICLES

CROSS REFERENCE TO RELATED APPLICATIONS

This is a non-provisional application that claims benefit to U.S. provisional application Ser. No. 62/772,185 filed on Nov. 28, 2018, which is herein incorporated by reference in its entirety.

FIELD

The present disclosure generally relates to intersection management of vehicles; and in particular, systems and methods for intersection management of connected autonomous vehicles.

BACKGROUND

According to the U.S. Federal Highway Administration, around 30 percent of fatal crashes between 2010 and 2015 occurred at intersection areas and were due to human error. In addition, each person in the United States is caught in traffic on average of around 42 hours per year. The advent of Connected Autonomous Vehicles (CAV) promises to drastically reduce such traffic fatalities and improve throughputs of transportation infrastructures. This promise has spurned both cooperative and centralized approaches to manage traffic intersections for CAVs. Centralized approaches are relatively more popular due to security concerns of vehicle-to-vehicle communication of cooperative approaches and their need for high network bandwidth.

Existing intersection management (IM) technologies tend to have issues with network traffic. Other IM models which assign velocities to CAVs approaching the intersection are vulnerable to model mismatches and external disturbances. This can lead to inaccurate velocity assignments which can lessen throughput of an intersection or cause accidents. In addition, some of these existing technologies assign actuation timestamps which can also be inaccurate, causing CAVs approaching an intersection to try to meet their assigned velocities at the wrong time, causing delays or accidents. As a result, IM models which assign velocities and actuation timestamps to CAVs tend to overcompensate for these limitations by including a large safety buffer, which can be inefficient and cause unnecessary delays. In addition, the large safety buffer requires vehicles to approach corners at unnecessarily slow speeds, thereby reducing throughput of an intersection.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1A:
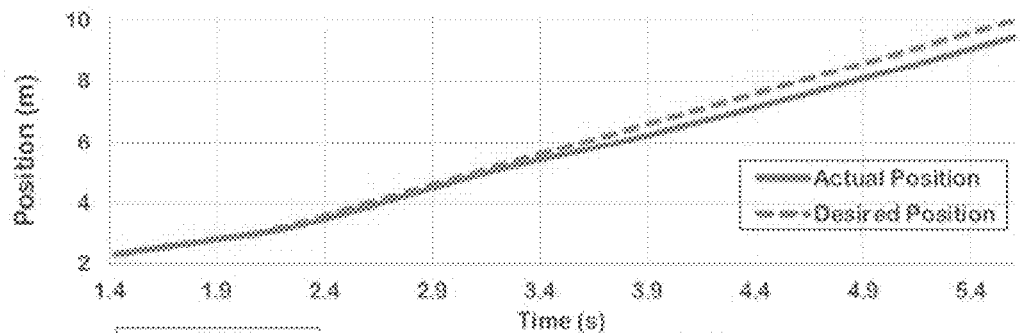
FIG. 1A is a graphical representation showing actual and expected positon of a vehicle.

Various embodiments of an intersection management system for managing the control of autonomous vehicles within an intersection are disclosed. In one aspect, the intersection management system functions as a distributed real-time system capable of processing of multiple nodes (e.g., vehicle controllers and an intersection controller) in which real-time information (e.g., position, velocity of the vehicle and timestamps) is transmitted from a vehicle controller to the intersection controller (IM) of the intersection management system. In some embodiments, the intersection management system synchronizes with vehicles that are approaching an intersection and each synchronized vehicle then transmits a request to the intersection management system via wireless communication, in which the intersection management system transmits a response to the synchronized vehicle. In one method, the intersection management system includes a processor that calculates an assigned time of arrival and velocity of arrival of each vehicle approaching an intersection. In one method of operation, a vehicle controller onboard a vehicle, such as an autonomous vehicle or connected autonomous vehicle (CAV), calculates and communicates to the intersection controller one or more possible trajectory paths for itself based on the assigned time and velocity of arrival which generates a best-case response and a worst-case response.

In one method, the intersection management system includes an intersection controller (processor) that assigns safe Time of Arrivals (TOA) and Velocity of Arrival (VOA). Since the vehicle controllers track their own trajectories, effects of model mismatch or external disturbances can be compensated for on an individual basis. In one feature of the intersection management system, vehicles that intend to make a turn at the intersection do not need to drive at a slow velocity before entering the intersection.

The present disclosure discusses a robust intersection management scheme for CAVs. During operation, each vehicle controller sends a request to the intersection controller (IM) including its current position, velocity, acceleration and the corresponding timestamp upon crossing a "transmit line". Then, the IM calculates a safe Time of Arrival (TOA) and Velocity of Arrival (VOA) for the vehicle such that there will be no predicted conflict in the intersection and sends the TOA and VOA back to the vehicle. Based on the assigned TOA and VOA, the vehicle calculates an optimal position trajectory and tracks it. Since each vehicle tracks its own reference position trajectory instead of continuing at a constant velocity, it can compensate for the effect of external disturbances and is robust against model mismatches. Additionally, with individual-based trajectories, some vehicles that intend to make a turn at the intersection can still travel at higher velocities before entering the intersection. Ultimately, allowing individual vehicles to calculate and track their own ideal trajectories based on their unique parameters to meet TOA and VOA guidelines provided by the IM, the throughput of an intersection may be improved.

Robust Intersection Management (RIM)

Figure 2:
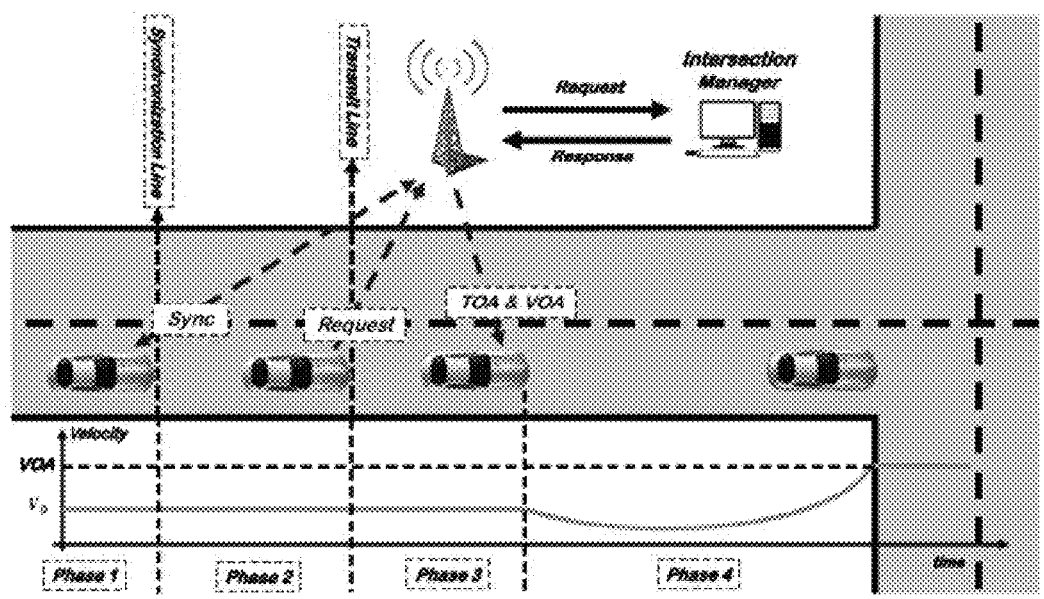
FIG. 2 is a simplified illustration showing different phases of a vehicle in the present intersection management system.

In the present system, referred to herein as RIM (Robust Intersection Management), the status of an approaching vehicle is divided into four phases: 1) when the vehicle is within the range of the intersection and before reaching a synchronization line, 2) after the synchronization line and before a Transmit line and 3) after sending a request and before receiving a response, 4) after receiving the response until crossing an entrance line and entering the intersection. FIG. 2 shows the status of a vehicle at different phases.

In phase 1, all vehicle controllers synchronize their local clock by either communicating with the IM or receiving a reference clock from a GPS (GPS satellites broadcast very accurate clocks). If the synchronization is successful, the vehicle enters phase 2 and sends its position (P), velocity (V), acceleration (a) and the corresponding timestamp (TS), as well as the outgoing lane (LO), max/min acceleration ($\alpha_{max}$ and $\alpha_{min}$) and an ID to the IM upon crossing the transmit line. In phase 3, the IM processes the request and calculates a feasible TOA and VOA, based on the status of the vehicle (V-Info) and the scheduling policy. A variety of scheduling policies are studied, however, some embodiments utilize a "first come, first serve" (FCFS) scheduling policy for simplicity. Then, the IM sends them back to the requesting vehicle. In this phase, the vehicle maintains its initial velocity until it receives the response. In phase 4, the vehicle creates a positional reference trajectory and follows it until it enters the intersection. The following model is used for the behavior of vehicles in 2D:

$$\begin{cases} \dot{x} = v\cos(\phi) \\ \dot{y} = v\sin(\phi) \\ \dot{\phi} = \frac{v}{L}\tan(\psi) \\ \dot{v} = u(t) \\ u(t) = K_a\left(-K_p e - K_i \int e - K_d \dot{e} + d(t)\right) \end{cases} \quad (1)$$

Where x, y are the longitude and latitude of the vehicle in Cartesian coordinates respectively, $\varphi$ is the heading angle of the vehicle relative to the x-axis, v is the linear velocity of the vehicle, L is vehicle's wheelbase distance, $\psi$ is the steering angle of front tires and u is the control input for the motor. $K_p$, $K_i$ and $K_d$ are PID (proportional-integral-derivative) controller gains, e, $\int e$ and $\dot{e}$ are the error between actual velocity and target velocity, its integral, and derivative respectively and d(t) is the applied disturbance. $K_a$ is a constant to the model actuator's gain. The input for the motor is u(t), which is generated as a Pulse Modulation Width (PWM) signal. It is assumed that the values of the PID controller and the actuator gain have model mismatches.

| Algoritm 1: Vehicle Controller |
|---|
| 1  if Sync line is crossed then |
| 2      result = synchronize( ); |
| 3      if result is not OK then |
| 4          if distance to transmit line is less than $d_{min}$ then |
| 5              update(Trajectory, SD); /* slow down */ |
| 6          end |
| 7          Goto Line 3; |
| 8      end |
| 9  end |
| 10 if Transmit line is crossed then |
| 11     V-Info = [P, V, a, TS, LO, $a_{max}$, $a_{min}$, ID]; |
| 12     send(V-Info); |
| 13     Wait for the response; |
| 14     if response is timed out then |
| 15         if distance to intersection is less than $d_{min}$ then |
| 16             update(Trajectory, SD); /* slow down */ |
| 17         end |
| 18         Goto Line 12; |
| 19     else |
| 20         [TOA, VOA] = getPacket(response) ; |
| 21         [$A_0$, $B_0$] = calculateTrajectory(TOA, VOA); |
| 22         update(Trajectory, [$A_0$, $B_0$]); /* set the ref Trajectory */ |
| 23     end |
| 24 end |

Vehicles

When the vehicle receives the TOA and VOA, it computes an optimal positional reference trajectory and a PID controller is utilized to track the trajectory. Each vehicle has a specified timeout to cap its waiting time when waiting for the response from the IM. Algorithm 1 shows pseudocode of the vehicle's controller. The value of $d_{min}$ (the distance a vehicle needs for stopping) is calculated based on $a_{min}$ (acceleration) and $v_{max}$ (velocity). In order to compute the positional reference trajectory, each vehicle stores its current position, velocity, and the timestamp as initial position ($x_0$), velocity ($v_0$) and time ($t_0$). Additionally, final position ($x_f$), VOA ($v_f$) and TOA ($t_f$) of the positional reference trajectory are known, having been received from the IM. Any position trajectory that satisfies the initial and final position condition ($x(t_0)=x_0$ and $x(t_f)=x_f$) and its derivative (velocity trajectory) satisfies the initial and final velocity conditions ($v(t_0)=v_0$ and $v(t_f)=v_f$) can be a candidate for the positional reference trajectory. However, it is important to find an optimal trajectory for the vehicle.

A function J is defined to minimize the acceleration of the trajectory:

$$J = \int_{t_0}^{t_f} a^2 dt \quad (2)$$

where a is the acceleration of a vehicle. After solving Equation (2) using the Fundamental Lemma of Calculus of Variation, the solution (acceleration trajectory) is found to be in the form of:

$$a(t) = A_0 t + B_0 \quad (3)$$

$A_0$ and $B_0$ are constant variables to be determined. Taking integral from (3):

$$v(t) = \tfrac{1}{2} A_0 t^2 + B_0 t + v_0 \tag{4}$$

Taking integral from (4) results in a cubic function as:

$$\chi(t) = \tfrac{1}{6} A_0 t^3 + \tfrac{1}{2} B_0 t^2 + v_0 t + \chi_0 \tag{5}$$

Without loss of generality, it is assumed that the initial time to for the positional reference trajectory is zero. By substituting t, x(t) and v(t) for boundary condition values, $t_f$, $x_f$ and $v_f$ in Equations (4) and (5), the following equations are derived:

$$\chi_f = \tfrac{1}{6} A_0 t_f^3 + \tfrac{1}{2} B_0 t_f^2 + v_0 t_f + \chi_0 \tag{6}$$

and $$v_f = \tfrac{1}{2} A_0 t_f^2 + B_0 t_f + v_0 \tag{7}$$

Solving Equations (6) and (7) for $A_0$ and $B_0$, yields:

$$\begin{cases} A_0 = \dfrac{6(2x_0 - 2x_f + t_f v_0 + t_f v_f)}{t_f^3} \\ B_0 = \dfrac{-2(3x_0 - 3x_f + 2t_f v_0 + t_f v_f)}{t_f^2} \end{cases} \tag{8}$$

Each vehicle computes its own values of $A_0$ and $B_0$ and creates its positional reference trajectory according to Equation (5). If a vehicle receives the target TOA and VOA within the worst-case delay (due to the IM's computation time and network delay), it's still able to determine a feasible trajectory that meets the final conditions (TOA and VOA).

Figure 3:
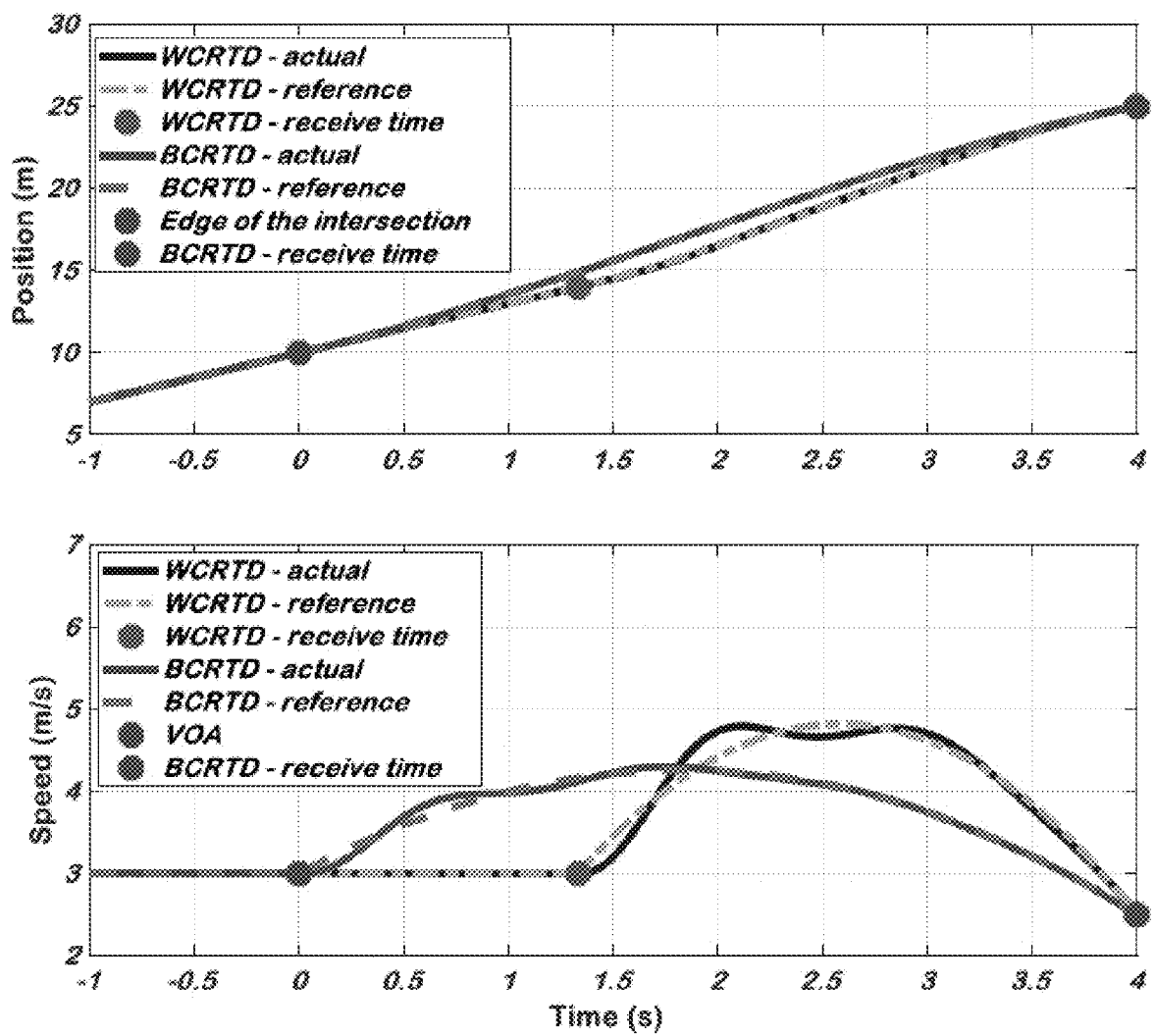
FIG. 3 shows graphical representations of the velocity and position trajectories for the best-case and worst-case round-trip delay in a network.

To have a better understanding, position and velocity trajectories of a vehicle were simulated (using Equation (1)) 15 m away from an intersection while driving at 3 m/s. The worst-case delay from IM to the vehicle in this case would be 1350 ms and the assigned TOA and VOA are 4 s and 2.5 m/s, respectively. Dashed lines in FIG. 3 show position and velocity trajectories for the best-case round-trip delay (BCRTD) and solid lines depict position and velocity trajectories for the worst-case round-trip delay (WCRTD) respectively. Delay in the network or IM processing time may affect the trajectory of the vehicle. However, no matter how great the delay is, as long as the delay is less than the worst-case execution time (WCET) plus the worst case network delay (WCND), the arrival time and velocity of the vehicle remains unaffected.

Algorithm 2: IM's Scheduling algorithm

```
1   Input: Request;
2   Outputs: [TOA, VOA];
3   while Request buffer is not empty do
4   |    V-Info = read(buffer[first]);
5   |    [TOA, VOA] = Schedule(V-Info, I-Info);
6   |    Result = F-Check(TOA, VOA, V-Info, I-Info);
7   |    if Result is OK then
8   |    |    Send(TOA, VOA, Vehicle Info);
9   |    |    update(I-Info)
10  |    else
11  |    |    Increase(TOA);
12  |    |    Goto Line 6;
13  |    end
14  end
```

Algorithm 3: F-Check function

```
1   v = calculateVelocity; /* based on Eq. (4) */
2   a = calculateAcceleration; /* based on Eq. (3) */
3   inLane = getLane(V-Info);
4   if max(v) < v_max and min(v) < v_min then
5   |    if max(a) < a_max then
6   |    |    For all cars ∈ I-Info s.t. V-Info.inLane = inLane
7   |    |    distance = distanceBetweenCar1andCar2;
8   |    |    if min(distance) > distance Threshold then
9   |    |    |    Result = OK;
10  |    |    else
11  |    |    |    Result = Not OK;
12  |    |    end
13  |    else
14  |    |    Result = Not OK;
15  |    end
16  else
17  |    Result = not OK;
18  end
```

Intersection Manager

When the IM receives a request from a vehicle, it computes a TOA and VOA based on the status of the requesting vehicle (V-Info) and the status of other vehicles that have already received a TOA and VOA (I-Info). Algorithm 2 shows the pseudo-code for the IM. Before sending back the computed TOA and VOA to the requesting vehicle, the IM verifies the feasibility of the computed TOA and VOA using the "F-Check" function shown in Algorithm 3. In order to check the feasibility of assigned TOA and VOA, the IM has to check the future trajectory of the vehicle and verify that road specifications ($V<V_{max}$), vehicle specifications ($a<a_{max}$) and safety specifications are not violated. From FIG. 3, one can observe that the area underneath the velocity profile is the same for both best-case and worst-case round trip delay (RTD). This is because the TOA and VOA are fixed. As a result, the vehicle will experience higher/lower velocities (a higher peak/a lower trough), as the receive time increases. Based on this observation, it can be concluded that if the worst-case trajectory does not violate the maximum/minimum velocity threshold, the best-case trajectory never exceeds such values. This way, it can be checked whether requirements are being met only by verifying the worst-case trajectory.

Safety Analysis

Figure 4:
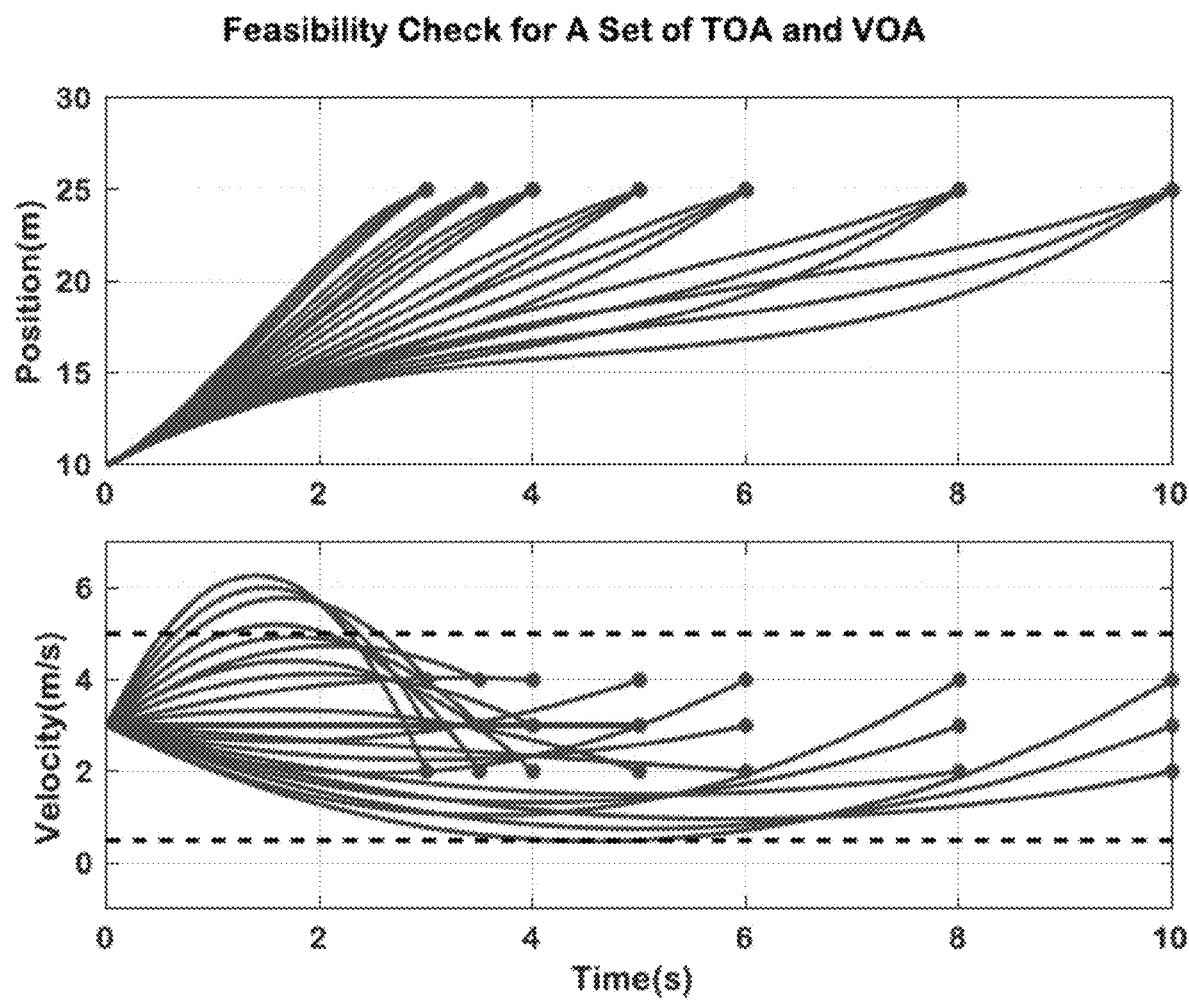
FIG. 4 shows graphical representations of an example of feasibility checking for a set of the Velocity-Of-Arrival (VOA) and Time-Of-Travel (TOA).

The IM needs to verify that the assigned TOA and VOA are safe. As a result, it performs a feasibility analysis for the best-case and worst-case scenarios. The F-Check function in Algorithm 3 computes worst-case values of $A_0$ and $B_0$ based on the WCND and WCET and, checks if the max value of the worst-case trajectory velocity is smaller than road speed limit ($V_{max}$) and the min value is greater than a threshold $V_{min}>0$. Additionally, F-Check verifies if the maximum acceleration of the worst-case trajectory is smaller than $a_{max}$. For different values of VOA and TOA, the position and velocity trajectories of a vehicle were simulated and depicted in FIG. 4, where green trajectories are feasible and red ones are infeasible. Since the extreme acceleration and deceleration cases occur only at boundary conditions, the IM can verify the feasibility of the worst-case reference trajectories by just checking the acceleration at the initial time. If the velocity trajectory for the WCRTD scenario exceeds the speed limit or its slope exceeds the acceleration limit ($a_{max}$), the trajectory is not feasible and the IM extends the TOA of the vehicle. However, if the velocity trajectory goes under the minimum velocity, it means that the vehicle should drive at a very slow speed, which is not practical. Once the vehicle calculates the actual individual-based values of $A_0$ and $B_0$, it sends them to the IM in order to confirm that it has received the assigned TOA and VOA and, lets the IM know how the trajectory would be.

Figure 5:
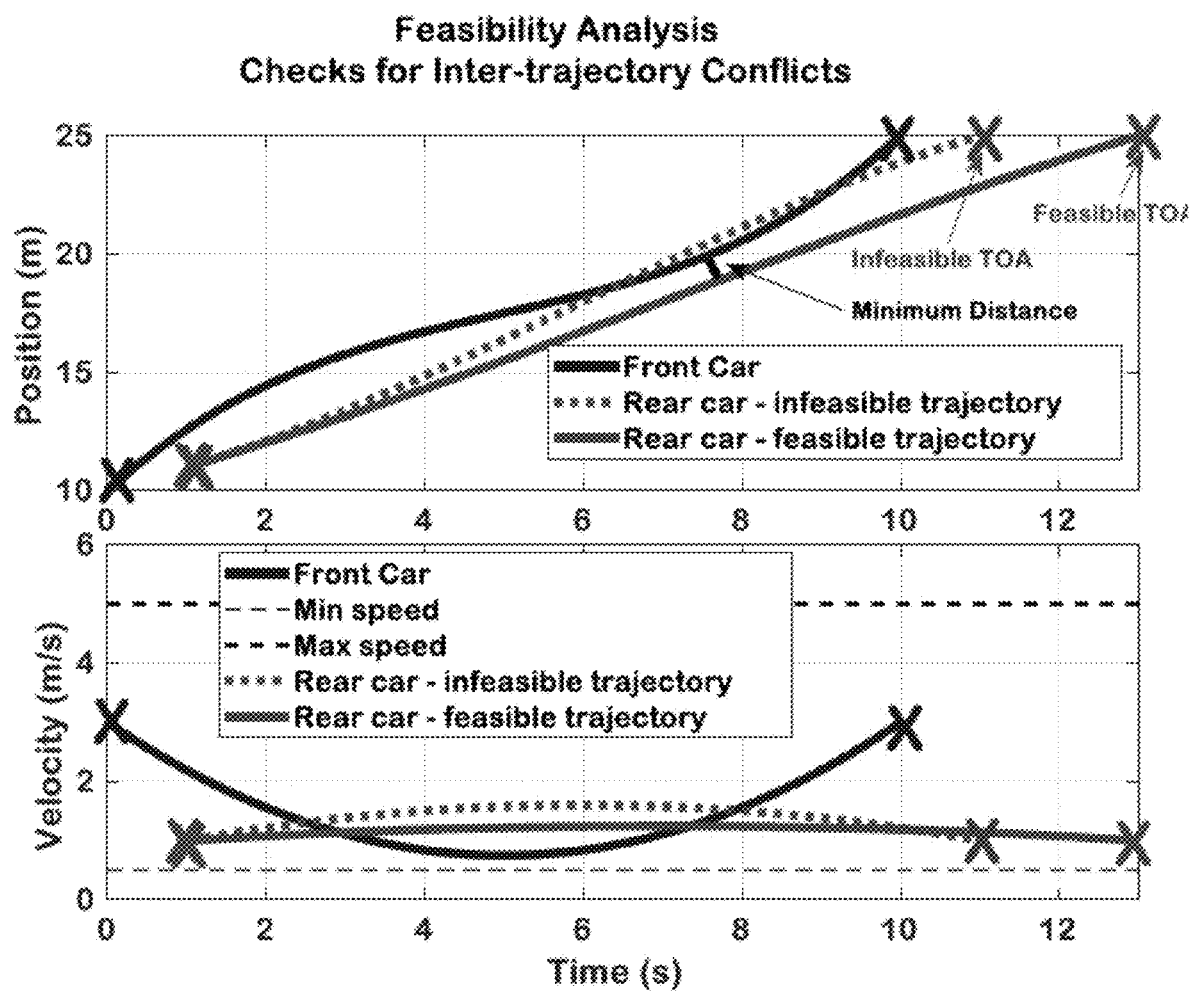
FIG. 5 shows graphical representations of a scenario where F-Check fails.

It is also possible that the trajectory of a vehicle conflicts with another vehicle in the same lane before reaching the intersection. A case was simulated where two vehicles driving in the same lane had a conflict on their position trajectory and their trajectories are predicted in FIG. 5. Blue trajectories belong to the front vehicle and the red and green ones belong to the rear vehicle. Red trajectories are not feasible while the green ones are feasible. The IM can find a feasible trajectory for the rear vehicle by increasing the TOA. If the distance between trajectories of two vehicles in the same lane is always greater than a threshold, the value of the result is an affirmative Otherwise, the result will not be an affirmative and the IM must increase the TOA and verify the TOA and VOA using the F-Check function again.

Practical Issues

Since the vehicles and the IM interact with each other, both should follow some rule as a prerequisite to the correct functionality of the system. For instance, the system will not work if the processing time of the IM is very high or if a vehicle takes a trajectory that fails to satisfy the assigned TOA and VOA. Therefore, some of the necessary requirements that should be met are discussed herein. It is challenging to find an upper bound for the network request time window because the delay in the network can be infinite. To address this issue, vehicles use a timeout mechanism to cap the waiting time of each vehicle. This ensures that a vehicle either receives the response within the expected delay or it will ignore the response if it is received afterward, as it will be irrelevant. The value of the timeout can be determined by measuring the average delay of the network and WCET of the IM. WCET can be calculated statically using existing WCET analysis methods. Similarly, if a vehicle fails to synchronize its clock with the IM or cannot get it from the GPS before reaching the transmit line, it should slow down and stop behind the intersection line.

As another requirement, vehicles must always retain a safe distance from their front vehicle. Typically, the Adaptive Cruise Control (ACC) system is responsible to maintain a safe distance from another vehicle in front by adjusting the velocity. Based on the Responsibility-Sensitive Safety (RSS) model, maintaining a minimum distance from the front vehicle requires having a bounded response time (from sensing to actuation). In order to guarantee the safety of the intersection, a set of requirements for vehicles and IM can be expressed. One way to formally express such safety requirements for each processing unit is specifying them using temporal logic (i.e., Timestamp Temporal Logic (TTL)). The list of safety requirements include:

The WCET of the IM when responding to a request should be less than a particular threshold $t_{IM}$.

The settling time of the PID controller should be kept short (settling time is referred to the time it takes for the vehicle to reach and maintain the assigned trajectory).

The network delay should be less than a threshold, $t_N$.

The response time of the ACC system should be less than a threshold to avoid accidents before reaching the transmit line and after exiting the intersection, $t_{ACC}$.

Thresholds are determined based on individual specifications of the intersection (intersection size, the distance of transmit line from the intersection, turn speed limit, wireless network, etc.), the IM (WCET), the network (WCND) and the vehicles (size, weight, max/min acceleration rate, etc.).

Experimental Testbed

Figure 6:
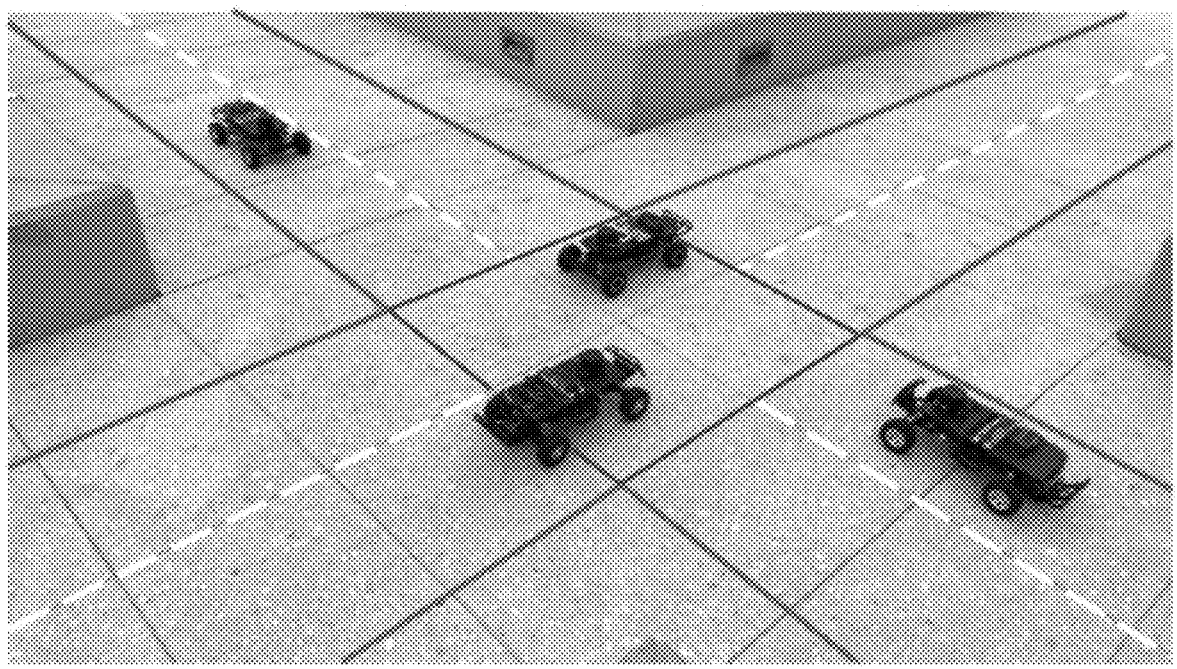
FIG. 6 is an overview showing a $\frac{1}{10}$ scale model intersection of autonomous vehicles.

In order to evaluate the present system, a 1/10 scale model 4-way intersection (FIG. 6) was built with 8 fully autonomous remote control (RC) vehicles that communicate with a stationary IM. The width of each lane was 60 cm and the transmit line was located 3 m away from the edge of the intersection. All autonomous vehicles were built on a Traxxas Slash chassis. The size of each vehicle is 30 cm×57 cm and can drive up to 5 m/s. The wheel-base size of each vehicle is 53.5 cm and its maximum steering angle is 45 degrees. The transmit line is located 3 meters away from the vehicle's initial position and the edge of the intersection is 6 meters away from the starting point of the vehicle.

Figure 7:
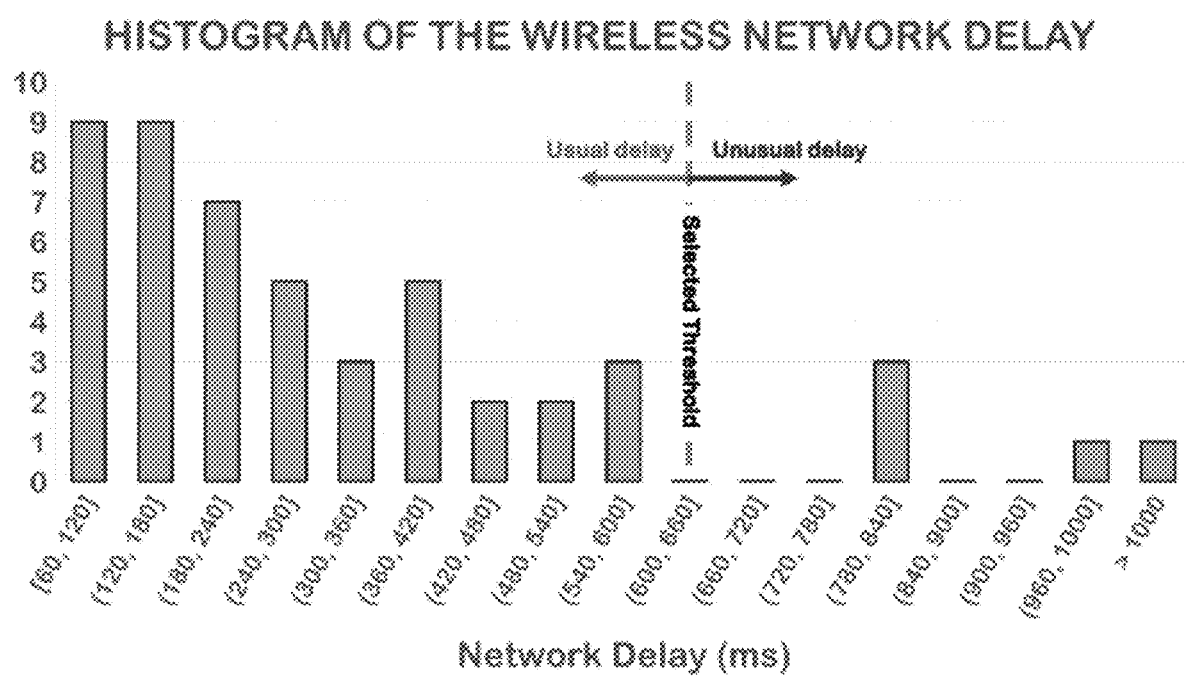
FIG. 7 is a graphical representation of a histogram of the measured network delay in the $\frac{1}{10}$ scale model testbed of the present intersection management system.

The main microcontroller is an Arduino Mega 2560 which performs trajectory tracking. A Bosch BN0055 absolute orientation sensor was used for measuring the heading angle of the vehicle and making a turn. Each vehicle communicated to the IM via an NRF24L01+, 2.4 GHz wireless module. A Hall Effect shaft encoder was used to measure the longitudinal position of the vehicle. Encoder data was processed by another microcontroller (Arduino Nano board) and the position data was sent to the main microcontroller over an I2C communication. The present system implemented a Proportional Integral Derivative (PID) controller for each vehicle. The maximum acceleration/deceleration of each vehicle was measured using empirical testing. The IM station includes an Arduino Mega 2560 and an NRF24L01+, 2.4 GHz wireless module for communication. A Network Time Protocol (NTP) time synchronization technique was used with an accuracy of synchronization of 10 ms. The synchronization packet had a size of 7 bytes (1 byte for message type, 4 bytes for timestamps and 2 bytes for ID). The size of a request packet was 30 bytes, which included ID, message type, velocity, position, captured timestamp, lane out, max acceleration, max deceleration, and max speed. The response packet had a size of 16 bytes, which included ID, message type, TOA, VOA and transmit line distance (the distance of transmit line from the edge of the intersection). The acknowledgement packet was 8 bytes and contained $A_0$ and $B_0$. For the experiment, vehicles were placed at arbitrary positions and started driving with arbitrary initial velocities. Before reaching the transmit line, vehicles synchronized their local clock with the IM by sending a sync packet. Each vehicle monitored its position and upon crossing the synchronization line or transmit line it sent a synchronization message or a request to the IM respectively. To estimate the worst-case delay for the IM, a reasonable value needed to be found for communication delay and WCET of the IM. FIG. 7 shows the histogram of the measured delay for the wireless network in 50 experiments. Based on the collected empirical data, the network threshold was set to be 600 ms. As a result, the value of timeout for each vehicle (discussed in Section III) can be calculated as:

$$t_{Timeout} = WCET + 2WCND$$

The WCET of the IM was estimated based on the maximum capacity of the intersection, which is related to the maximum number of vehicles that can fit in the intersection and road before it. The estimated WCET of the IM for the microcontroller (ATMega2560 with a clock frequency of 16 MHz) was 56 ms. As a result, the timeout was set to be 1256 ms. Since vehicles ignore a response after the timeout, it can be stated that the WCRTD was 1256 ms for the experimental testbench.

Experimental Results

Two types of experiments were conducted: i) safety-related and ii) throughput-based experiments. The first experiment highlights the effectiveness of the RIM technique in reducing the position error and the second experiment shows the usefulness of the RIM in improving the throughput of the intersection compared with other known systems. In safety experiments, the impact of external disturbances and model mismatch on the eventual position of the vehicle were evaluated in 3 different experiments:

Effect of External Disturbances (ED) on TOA

Figure 8:
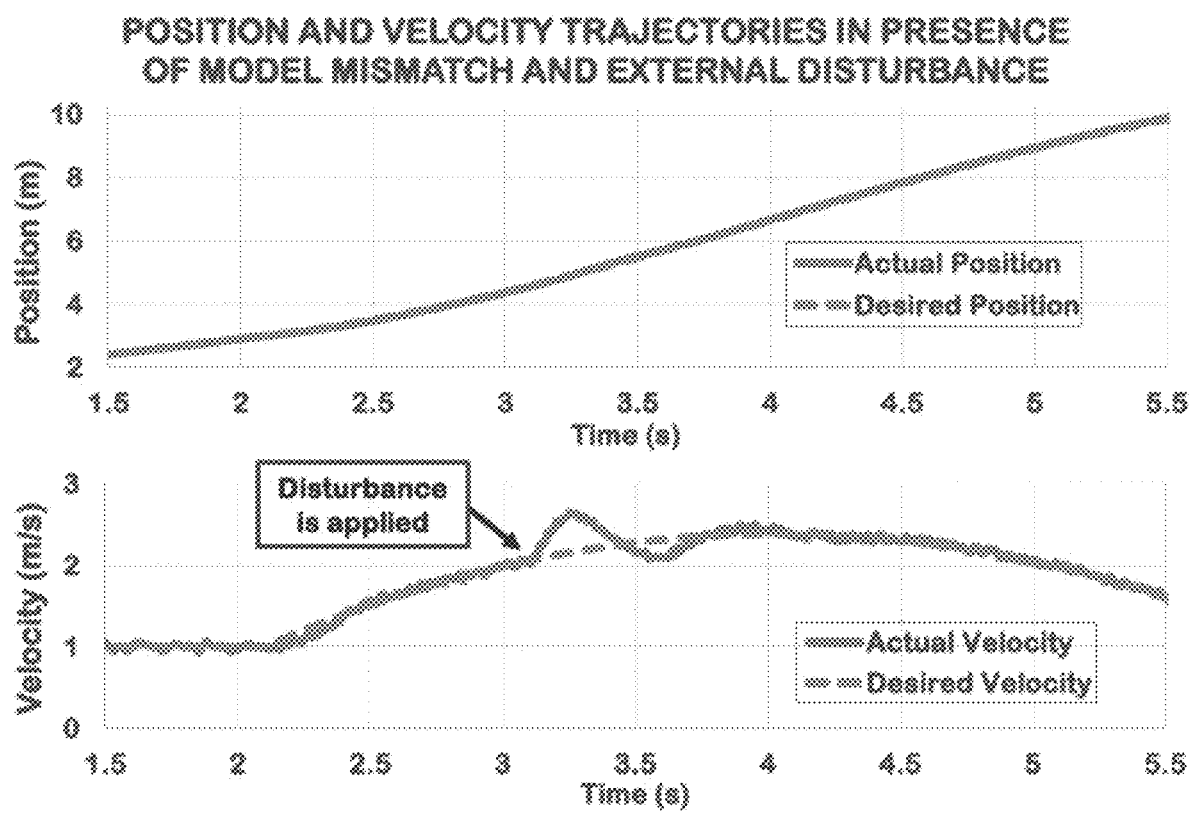
FIG. 8 shows graphical representations of when an external disturbance is applied to the autonomous vehicle that causes a temporary degradation in velocity.

To model the external disturbance, a step function was added with amplitude of up to 5% of the maximum range to the PWM signal (generated by the controller for the motor) and the position error was measured at the expected TOA for both a "Crossroads" system and the present system. FIG. 8 depicts the position and velocity trajectories of a vehicle under an RIM interface in presence of an external disturbance with the amplitude of 10% of the max value. Despite the fact that the velocity trajectory of the vehicle is deviated by the external disturbance, it is still able to meet the set TOA and VOA.

Effect of Model Mismatches (MM) on TOA

Figure 1B:
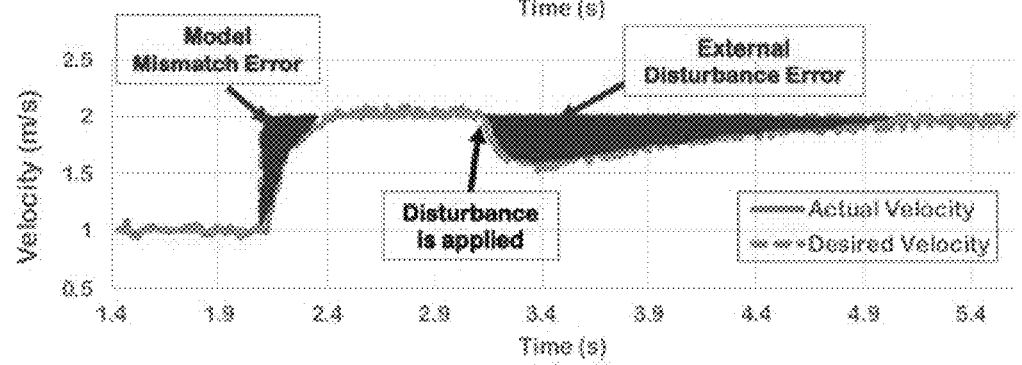
FIG. 1B is a graphical representation showing actual and expected velocity of a vehicle in the presence of model mismatch and an external disturbance.

One limitation of the Crossroads Nis that it needs to account for the response time of vehicles when computing the target velocity and actuation time. However, the response time calculation is done based on the considered model and can very easily be inaccurate. To see how model mismatches can affect the TOA, up to 10% error was added to parameters of the PID controller ($K_P$, $K_I$, and $K_D$), which is related to the estimated actuation time by the IM. The position error was measured at the expected TOA for both Crossroads and RIM techniques and reported in FIGS. 1A, 1B and 8.

Effect of Combined MM and ED on TOA

Figure 9:
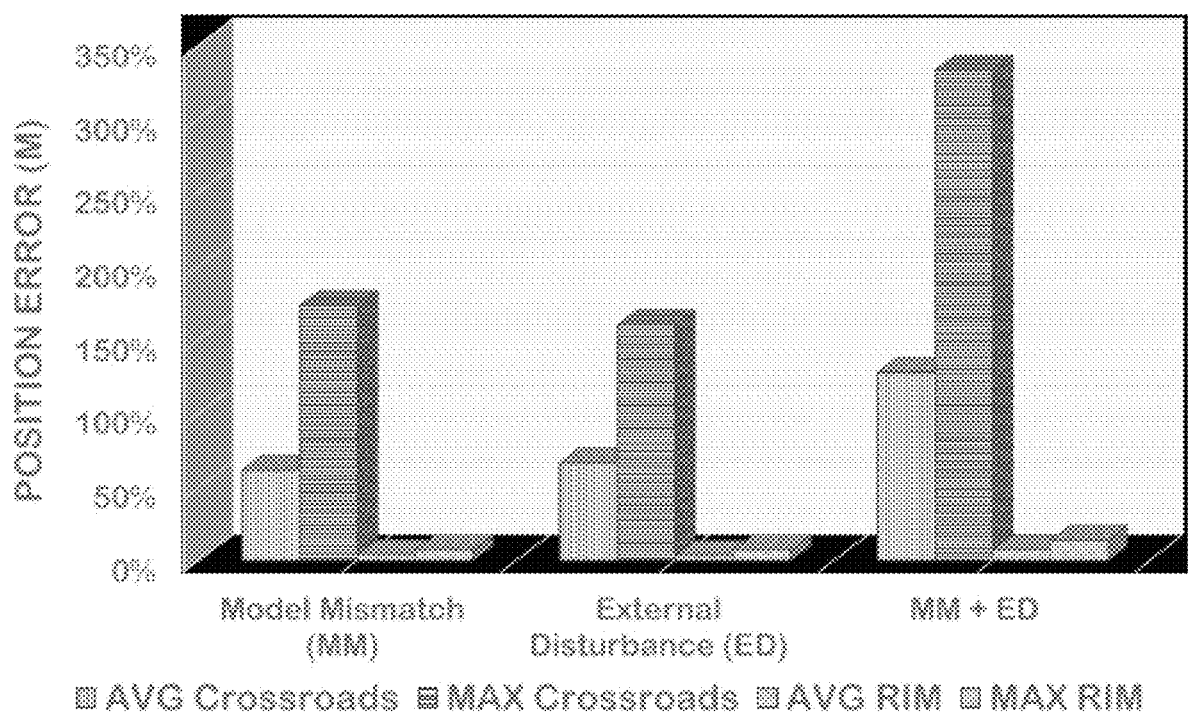
FIG. 9 is a graphical representation showing the average and worst-case position error of vehicles at a designated Time-of-Arrival (TOA).

In this experiment, both the external disturbance and model mismatch were modeled similar to the first and second experiments and recorded the measured position error at the expected TOA. Then, the results for the Crossroads approach and the present system were compared. Each experiment was repeated 50 times for a different set of initial velocities and positions and, the position error was reported by storing the position of vehicles along with a timestamp on the EEPROM (electrically erasable programmable read-only memory) of their microcontroller. FIG. 9 shows the average and the worst-case position error of vehicles at the expected TOA for Crossroads and RIM, normalized to the size of the vehicle. Results from FIG. 9 indicate that on average, RIM can reduce the position error by 18X compared to the Crossroads technique. Since Crossroads ignores the effect of model mismatch and external disturbances, they are not safe and accidents can happen. In order to safely manage vehicles using a constant velocity, Crossroads considers a particularly large safety buffer around all vehicles to avoid accidents. Results from these experiments show that the size of the extra safety buffer can be as large as 3.2× of the vehicle length in the worst-case (model mismatch (MM) and external disturbances (ED) together). Considering such a Marge buffer around each vehicle guarantees the safety of the vehicle but is impractical since it reduces the throughput of the intersection greatly.

Velocity Management for Vehicles Making a Turn

In intersections with a separate road for a right turn, the turn speed limit can be as high as 31 mph. However, for small intersections, vehicles may have to make a sharper right turn and therefore, the turn speed limit can be as low as 9 mph. In this experiment, the wait time of all vehicles was measured from transmit line to the departure of the intersection, by storing entrance and departure timestamps on the EEPROM memory of the vehicle's microcontroller.

Figure 10:
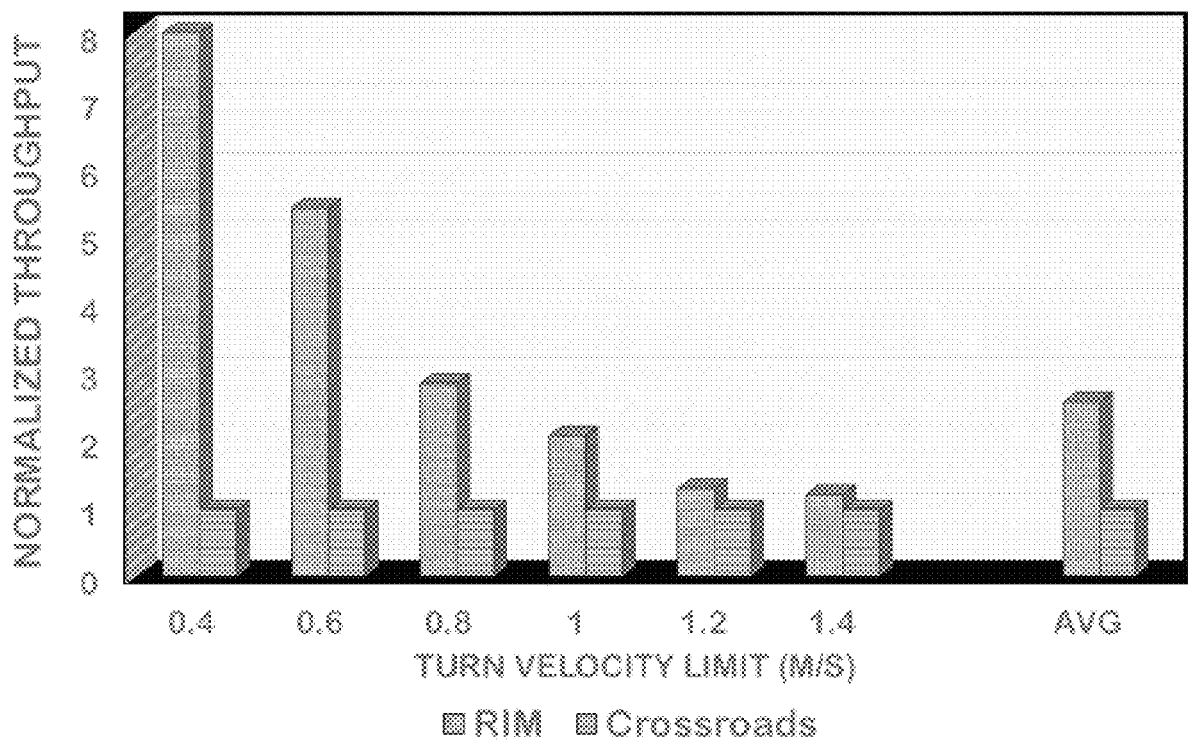
FIG. 10 is a graphical representation showing speedup in throughput for common turn velocity limits.

The maximum allowed velocity for making a turn in the 1/10 scale model varies from 0.4 m/s to 1.4 m/s (9 mph to 31 mph for a real intersection) and, the speed limit (for the road) is 2.5 m/s (55 mph). FIG. 10 shows the throughput of RIM and Crossroads normalized to the throughput of the Crossroads.

Results show that RIM can achieve 2.7× better throughputs on average in comparison with Crossroads and other VA-IM techniques and, 8× in the best-case (lowest turn speed limit). The great difference in the throughput at low turn speeds has two main reasons: i) the scheduling policy of the IM and ii) induced behavior from the front vehicle. Since the scheduling policy in most embodiments is FCFS, a vehicle that tends to go straight will be slowed down if it is behind another vehicle that is already making a turn at the intersection. For other scheduling policies used in other embodiments of the present system like BATCH, the difference can be lower. Since setting arbitrary input flow rates in real experiments is hard, the effect of considering the extra safety buffer on the throughput of the intersection will be studied using the simulator.

Extension to Multi-Lane Intersections

Figure 11:
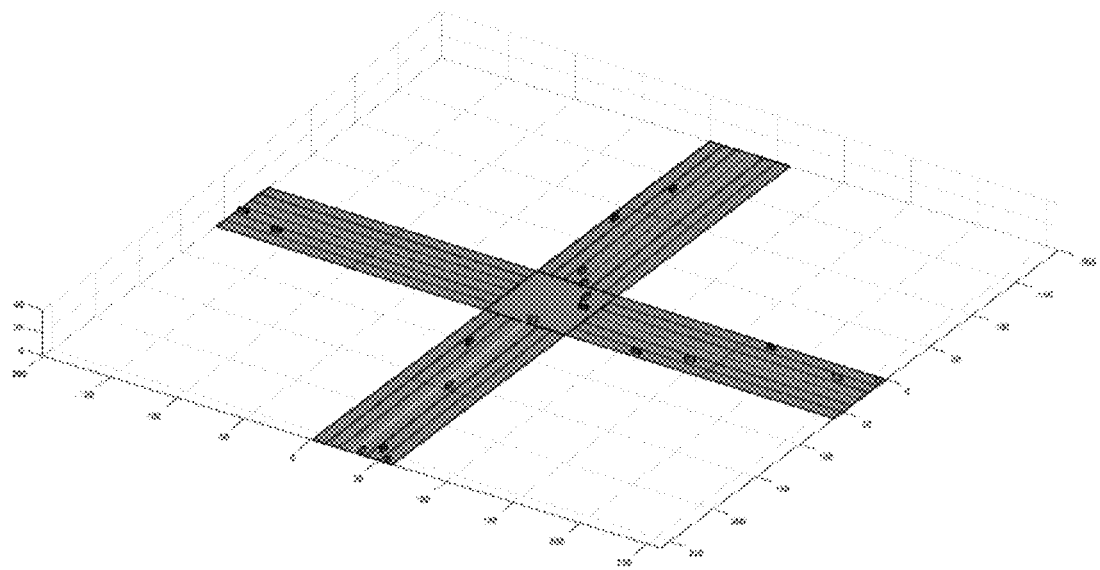
FIG. 11 is an illustration showing a view of a three-dimensional simulator.
Figure 12:
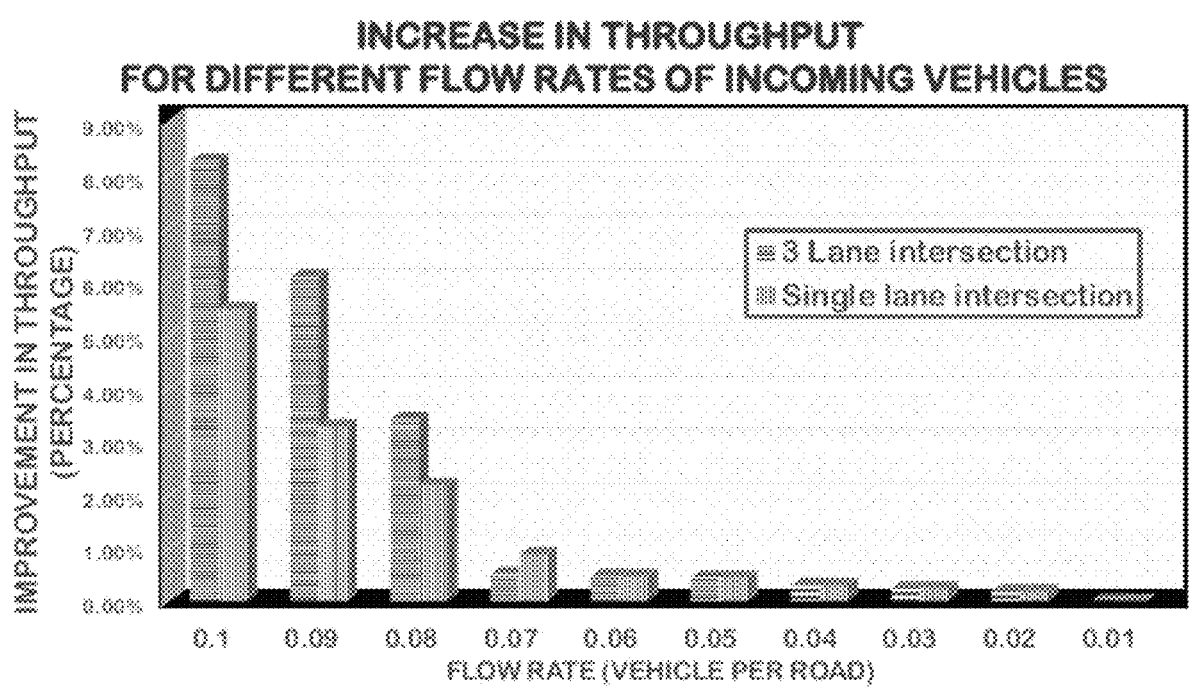
FIG. 12 is a graphical representation showing the increase in throughput for different flow rates of incoming vehicles.

In order to show that the present system can be easily be scaled to multi-lane intersections, a 3D simulator was built in MATLAB®. The simulator considers a separate processing unit for vehicles and the IM and all data exchanging is done through the communication over a network. The network has the capability of modeling a random network delay and packet loss. FIG. 11 shows a view of the MATLAB simulator. In the MATLAB simulator, a four-way intersection with 3 lanes per road was created. The intersection size was 60×60 m and lane width was 10 m. The size of simulated vehicles was 6×2 m with the wheelbase of 5 m. The maximum value of acceleration was 5 m/s2 and deceleration was −8 m/s2. The result of the experiment was used on the 1/10 scale model autonomous vehicle to estimate the size of the extra safety buffer for the Crossroads technique. Since the length of the vehicle was 6 m and the error due to model mismatch and possible external disturbances can be as large as 3.3× of the length of the vehicle, the extra safety buffer size was calculated as 20 m (10 m in front of the vehicle and 10 m behind it). The transmit line was 200 m away from the intersection and the sync line was 250 m away from the intersection. An FCFS policy was implemented for the IM and requests were processed based on their arrival time. FIG. 12 shows the degradation of the throughput in a single lane intersection and in a multi-lane intersection (3 lanes per road) due to considering an extra safety buffer around vehicles. Results in FIG. 12 show that the present system can improve the throughput of the intersection by up to 8% for a multilane intersection and up to 5% for a single lane intersection when there is no need for considering an extra safety buffer for model mismatches and external disturbances. In order to fairly compare the throughput of the Crossroads technique against RIM, the improvement result should be considered from both FIGS. 10 and 12. This is because RIM can increase the throughput by managing the speed of vehicles making a turn at the intersection and avoid considering an extra safety buffer.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
   an intersection defining an entrance line, a transmit line located before the entrance line, and a synchronization line located before the transmit line;
   an intersection controller associated with the intersection;
   a vehicle controller located onboard a vehicle in communication with the intersection controller; and
   a plurality of sensors in communication with the vehicle controller, wherein each of the plurality of sensors is operable for monitoring vehicle status data;
   wherein the vehicle controller synchronizes with the intersection controller upon crossing the synchronization line;
   wherein the vehicle controller transmits vehicle status data to the intersection controller upon crossing the transmit line;
   wherein the intersection controller assigns a time of arrival and velocity of arrival to the vehicle controller based on the vehicle status data; and
   wherein the vehicle controller determines an ideal trajectory based on the vehicle status data and follows the ideal trajectory until the vehicle crosses the entrance line of the intersection.

2. A method for intersection management comprising:
   synchronizing a vehicle controller with an intersection controller, wherein the vehicle controller is associated with an autonomous vehicle and the intersection controller is associated with an intersection;
   transmitting a request including vehicle status data from the vehicle controller to the intersection controller when the autonomous vehicle crosses a transmit line of the intersection;
   receiving a time of arrival and a velocity of arrival for the autonomous vehicle from the intersection controller;
   determining a positional reference trajectory for the autonomous vehicle using the vehicle status data, the time of arrival and the velocity of arrival; and
   tracking the autonomous vehicle as the autonomous vehicle follows the positional reference trajectory until the autonomous vehicle enters the intersection, wherein the time of arrival dictates a time that the autonomous vehicle must enter the intersection and the velocity of arrival dictates a velocity that the autonomous vehicle must reach upon entering the intersection.

3. The method of claim 2, wherein the vehicle status data comprises one or more of vehicle position data, velocity data, acceleration data, timestamps data, outgoing lane designation data, acceleration limits data, and velocity limits data.

4. The method of claim 2, wherein the positional reference trajectory is determined using at least the velocity of arrival, the time of arrival, a final position, and an initial velocity, an initial time and an initial position received from the vehicle status data to determine a value of a first coefficient and a value of a second coefficient, wherein the first and second coefficients are constant values pertaining to an acceleration trajectory with respect to time.

5. The method of claim 4, wherein the first and second coefficients are used in conjunction with the initial velocity and initial position to determine the positional reference trajectory with respect to time.

6. The method of claim 5, wherein the positional reference trajectory is derived by taking the second integral of the acceleration trajectory and wherein the acceleration trajectory is minimized.

7. The method of claim 2, wherein the vehicle controller comprises a proportional-integral-derivative controller and wherein the proportional-integral-derivative controller tracks the vehicle as the vehicle follows the positional reference trajectory.

8. The method of claim 2, wherein the vehicle controller comprises a timeout mechanism operable for limiting an amount of time the vehicle controller waits for a communication from the intersection controller.

9. The method of claim 2, wherein the vehicle controller slows the autonomous vehicle and stops the autonomous vehicle behind an intersection entrance line if the vehicle controller fails to synchronize with the intersection controller.

10. The method of claim 7, wherein a settling time of the proportional-integral-derivative controller is minimal and wherein a response time of an onboard adaptive cruise control system is less than a predetermined response time threshold, wherein the predetermined response time threshold is determined based on a set of individual specifications of the intersection.

11. A method for intersection management comprising:
    synchronizing a vehicle controller with an intersection controller, wherein the vehicle controller is associated with an autonomous vehicle and the intersection controller is associated with an intersection;
    receiving a request including vehicle status data from the vehicle controller to the intersection controller when the autonomous vehicle crosses a transmit line of the intersection;
    determining a time of arrival and a velocity of arrival based on the vehicle status data;
    evaluating feasibility of the time of arrival and the velocity of arrival; and
    transmitting the time of arrival and the velocity of arrival for the autonomous vehicle to the vehicle controller from the intersection controller.

12. The method of claim 11, wherein the vehicle status data comprises vehicle position data, velocity data, acceleration data, timestamps data, outgoing lane designation data, acceleration limits data, and velocity limits data.

13. The method of claim 11, wherein evaluation of the feasibility of the time of arrival and the velocity of arrival further comprises:
    computing a worst-case trajectory and incorporating a worst-case network delay and worst-case execution time.

14. The method of claim 13, wherein computation of the worst-case trajectory further comprises:
    determining a worst-case value of a first coefficient and a worst-case value of a second coefficient, wherein the first and second coefficients are constant values pertaining to an acceleration trajectory with respect to time.

15. The method of claim 11, wherein evaluation of the feasibility of the time of arrival and the velocity of arrival further comprises:
    verifying if a maximum value of a worst-case velocity trajectory is less than the speed limit of the road;
    verifying if a minimum value of the worst-case velocity trajectory is greater than a minimum velocity threshold of the vehicle; and
    verifying if a maximum value of a worst-case acceleration trajectory is less than the maximum acceleration limit of the vehicle.

16. The method of claim 11, further comprising:
extending the time of arrival if the time of arrival and the velocity of arrival are not feasible.

17. The method of claim 11, wherein the time of arrival dictates a time that the vehicle must enter the intersection and the velocity of arrival dictates a velocity that the autonomous vehicle must reach upon entering the intersection.

18. The method of claim 11, wherein the intersection controller uses both the vehicle status data of the autonomous vehicle and vehicle status data of other autonomous vehicles approaching the intersection which have already received a time of arrival and a velocity of arrival to determine the time of arrival and the velocity of arrival of the autonomous vehicle.

19. The method of claim 11, wherein a network delay value is less than a predetermined network delay threshold and wherein the worst-case execution time of the intersection controller is less than a predetermined intersection controller response threshold, wherein the predetermined intersection controller response time threshold is determined based on a set of individual specifications of the intersection.

\* \* \* \* \*